E. BARTON.
Cider-Mill.
No. 217,976.  Patented July 29, 1879.
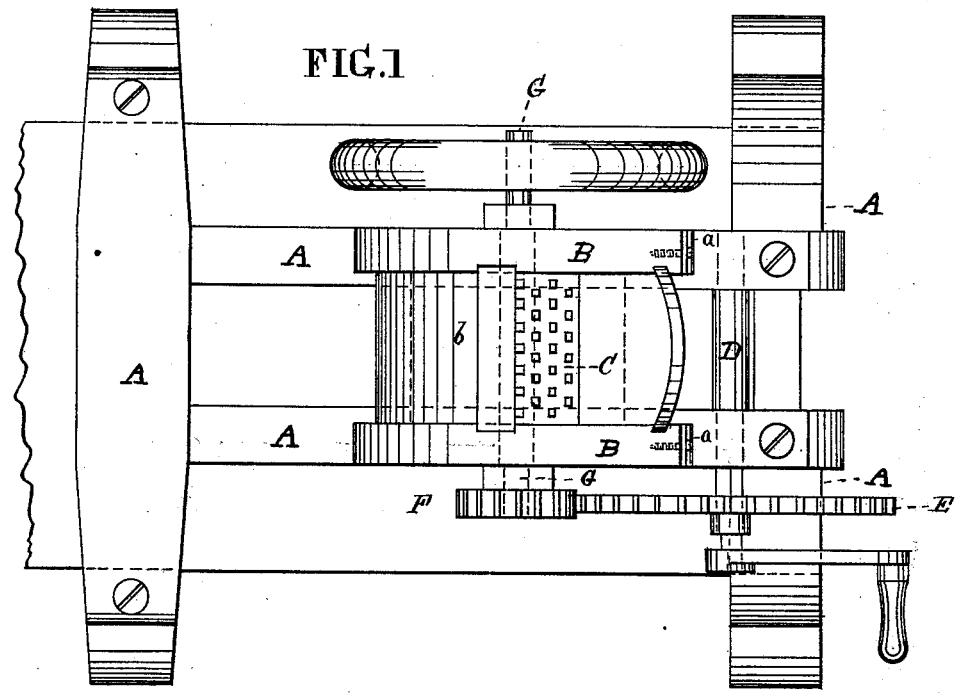
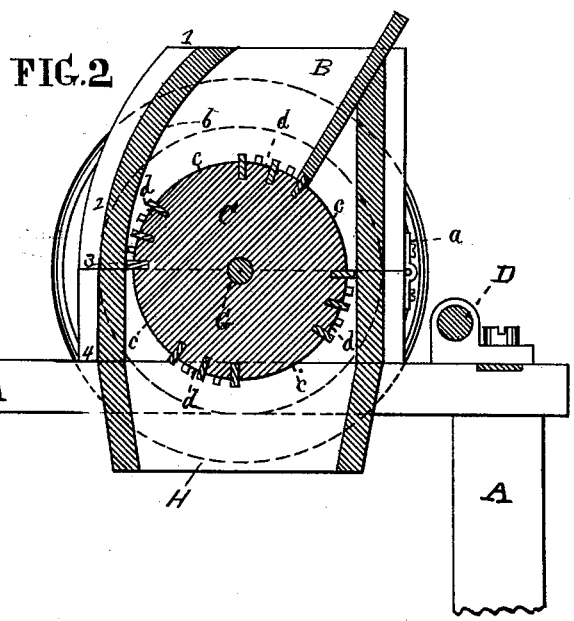
Witnesses
Thomas J. Bewley
H. N. Frame
Inventor
Edmund Barton
per Stephen Ustick attorney

UNITED STATES PATENT OFFICE

EDMUND BARTON, OF PHILADELPHIA, PENNSYLVANIA.

IMPROVEMENT IN CIDER-MILLS.

Specification forming part of Letters Patent No. 217,976, dated July 29, 1879; application filed October 24, 1878.

*To all whom it may concern:*

Be it known that I, EDMUND BARTON, of the city and county of Philadelphia, in the State of Pennsylvania, have invented certain new and useful Improvements in Cider-Mills, of which the following is a full, clear, and exact description, reference being had to the accompanying drawings, wherein—

Figure 1 is a top or plan view of a mill or press embodying my invention, and Fig. 2 a central vertical longitudinal section of the same.

Before my invention apple-grinding mills had been made with curved fronts or concaves, between which and a rotating cylinder armed with teeth apples were reduced to pomace. Such concaves have been so constructed as to require a follower-block, to force the fruit to the grinding-surface, and others have been made yielding, or as a spring, to adapt the machine for clearing obstructions or accumulations.

The object of my invention is to avoid, on the one hand, the use of a follower-block, and, on the other, a spring concave, and to accomplish the perfect feeding of the fruit, and remedy or prevent choking by the peculiar construction of the concave.

My invention consists in a cider-mill composed of a hopper, a toothed grinding or grating cylinder, and a curved front or concave, in which the reduction of the fruit to pomace is completed at a point central of the horizontal plane of the cylinder, below which the concave or curved front extends in a straight, or nearly straight, line, so as to afford a free path for the escape of the pomace to the press or other receptacle.

In the drawings, the letter A designates a frame of suitable construction to receive my mechanism. Upon this frame is secured a hopper, H, having its top half hinged at *a*, so as to be capable of being turned back, for a purpose hereinafter explained. In the sides of this hopper, or in suitable bearings, is arranged a shaft, G, upon which, within the hopper, is secured the grating-cylinder C. This cylinder has longitudinal rows of teeth *d*, projecting from its periphery, and such teeth are arranged in groups of four rows each, with alternating spaces *c*. Of course I do not limit my invention to the exact number of teeth or rows of teeth in a group; but I deem it essential that the teeth of every alternate row should stand opposite the spaces of the adjacent row, so as to present a closely-toothed grinding-surface.

The cylinder is revolved by means of a pinion, F, on the shaft G, engaged by a spur-wheel, E, on a shaft, D. The motion may be applied by a crank on shaft D, and the shaft G may have a fly-wheel.

The front *b* of the hopper H is curved longitudinally, or is concaved, (see Fig. 2,) and its greatest curvature extends from the top 1 downwardly to the point 2, so as to cause the fruit to gather at that point, which is the point at which the grinding begins. From the point 2 downwardly the concave *b* straightens or tends inwardly, so that at the point 3, which is central with the cylinder, the teeth of the cylinder and the concave come into close contact, and the fruit is completely reduced to pomace fit for the press.

I have found that by arranging the effective working-surface of the cylinder and concave in about the horizontal central plane of the cylinder the best results are obtained, and that having been subjected to this close grinding the fruit should be at once discharged. To effect this immediate discharge the concave is nearly straight from the point 3 down to 4, whereby a large free space is left below the grinding-point, and the pomace, descending, escapes through the throat into the press or cage, or vessel arranged beneath the hopper to receive it. By this construction of the hopper front or concave I obtain what I call a "curve feed," whereby I am enabled to dispense with follower-blocks and spring-concaves, and thereby produce a simpler and cheaper mill and effect as perfect a feed.

By the arrangement of the teeth in straight rows the skins of the fruit are prevented from clogging and the cylinder is kept free.

By hinging the upper half of the hopper I am enabled to have easy access to the cylinder for cleaning or repairing it.

What I claim is—

1. The cider-mill herein described, composed of a hopper, a toothed grinding or grating cylinder, and a concave or curved front, in which the reduction of the fruit to pomace is completed at a point central of the horizontal plane of the cylinder, below which the concave or curved front extends in a straight, or nearly straight, line, so as to afford a free path for the escape of the pomace, substantially as specified.

2. The grating-cylinder described, having alternating groups of longitudinal rows of teeth and spaces, the teeth being arranged so that those in alternate rows shall be opposite the spaces in the adjacent rows, in combination with a concave whose point of contact with said cylinder is in line with the central horizontal plane of the cylinder, substantially as specified.

EDMUND BARTON.

Witnesses:
STEPHEN USTICK,
THOMAS J. BEWLEY.